United States Patent
Kiyokawa et al.

(10) Patent No.: US 12,110,189 B2
(45) Date of Patent: Oct. 8, 2024

(54) ARTICLE TRANSPORT FACILITY

(71) Applicant: Daifuku Co., Ltd., Osaka (JP)

(72) Inventors: Wataru Kiyokawa, Tokyo (JP); Daisuke Katagiri, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 92 days.

(21) Appl. No.: 18/007,869

(22) PCT Filed: Mar. 3, 2021

(86) PCT No.: PCT/JP2021/008114
§ 371 (c)(1),
(2) Date: Dec. 2, 2022

(87) PCT Pub. No.: WO2021/246008
PCT Pub. Date: Dec. 9, 2021

(65) Prior Publication Data
US 2023/0227267 A1 Jul. 20, 2023

(30) Foreign Application Priority Data
Jun. 5, 2020 (JP) .................. 2020-098362

(51) Int. Cl.
*B65G 43/08* (2006.01)
*B65G 1/133* (2006.01)
*B65G 1/137* (2006.01)
*B65G 35/06* (2006.01)

(52) U.S. Cl.
CPC ............. *B65G 43/08* (2013.01); *B65G 1/133* (2013.01); *B65G 1/1373* (2013.01); *B65G 35/06* (2013.01); *B65G 2203/0241* (2013.01); *B65G 2203/0291* (2013.01); *B65G 2203/041* (2013.01)

(58) Field of Classification Search
CPC ........ B65G 43/08; B65G 47/52; B65G 1/133; B65G 2203/0241; B65G 2203/041; B65G 43/00; B65G 1/0485; B65G 1/1373; B65G 35/06; B65G 2203/0291
See application file for complete search history.

(56) References Cited

U.S. PATENT DOCUMENTS

| | | | | |
|---|---|---|---|---|
| 5,588,520 A | * | 12/1996 | Affaticati | B65G 47/31 198/502.2 |
| 5,990,437 A | * | 11/1999 | Coutant | B65G 47/965 209/3.3 |
| 6,323,452 B1 | * | 11/2001 | Bonnet | B07C 3/082 209/583 |

(Continued)

FOREIGN PATENT DOCUMENTS

| | | | | |
|---|---|---|---|---|
| CN | 109663737 A | * | 4/2019 | B07C 3/08 |
| JP | 2004075254 A | * | 3/2004 | |

(Continued)

*Primary Examiner* — Gene O Crawford
*Assistant Examiner* — Muhammad Awais
(74) *Attorney, Agent, or Firm* — The Webb Law Firm

(57) ABSTRACT

A transfer operation control unit changes, according to an operating state index indicating a level of an operating state of a plurality of transport vehicles (1) present on a travel path, a setting of a transfer operation such that a required transfer time (Tr) from start to completion of the transfer operation is increased as the level of the operating state is reduced, while maintaining at least one setting of a traveling speed of the transport vehicles (1).

7 Claims, 4 Drawing Sheets

(56) References Cited

U.S. PATENT DOCUMENTS

| | | | |
|---|---|---|---|
| 10,526,146 B1* | 1/2020 | Resnick | B65G 47/52 |
| 2009/0065330 A1* | 3/2009 | Lupton | B65G 47/684 |
| | | | 700/223 |
| 2013/0248323 A1* | 9/2013 | Sotelo | B65G 47/967 |
| | | | 198/370.04 |
| 2014/0249666 A1* | 9/2014 | Radwallner | B65G 1/137 |
| | | | 700/216 |
| 2015/0217334 A1* | 8/2015 | Kim | B07C 3/08 |
| | | | 209/552 |
| 2015/0239015 A1* | 8/2015 | Asari | B65G 47/68 |
| | | | 209/606 |
| 2016/0046453 A1* | 2/2016 | Fujio | B65G 21/22 |
| | | | 198/469.1 |
| 2016/0052722 A1* | 2/2016 | Fujihara | B65G 43/08 |
| | | | 198/358 |
| 2017/0057756 A1* | 3/2017 | Dugat | B07C 5/36 |

FOREIGN PATENT DOCUMENTS

| | | | |
|---|---|---|---|
| JP | 2004123350 A | * | 4/2004 |
| JP | 2011192060 A | * | 9/2011 |
| JP | 2019125275 A | * | 7/2019 |

* cited by examiner

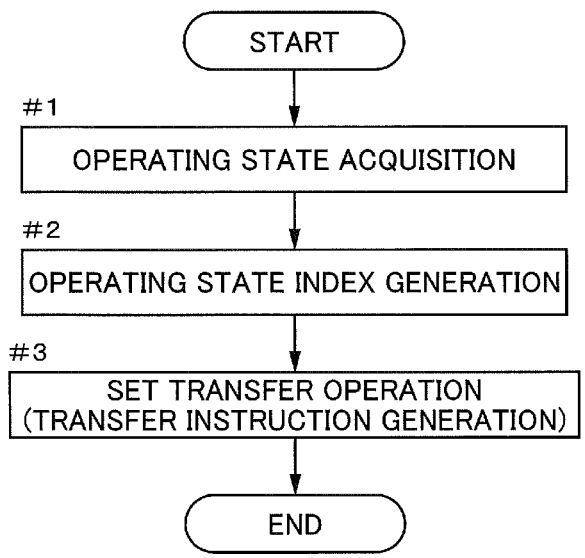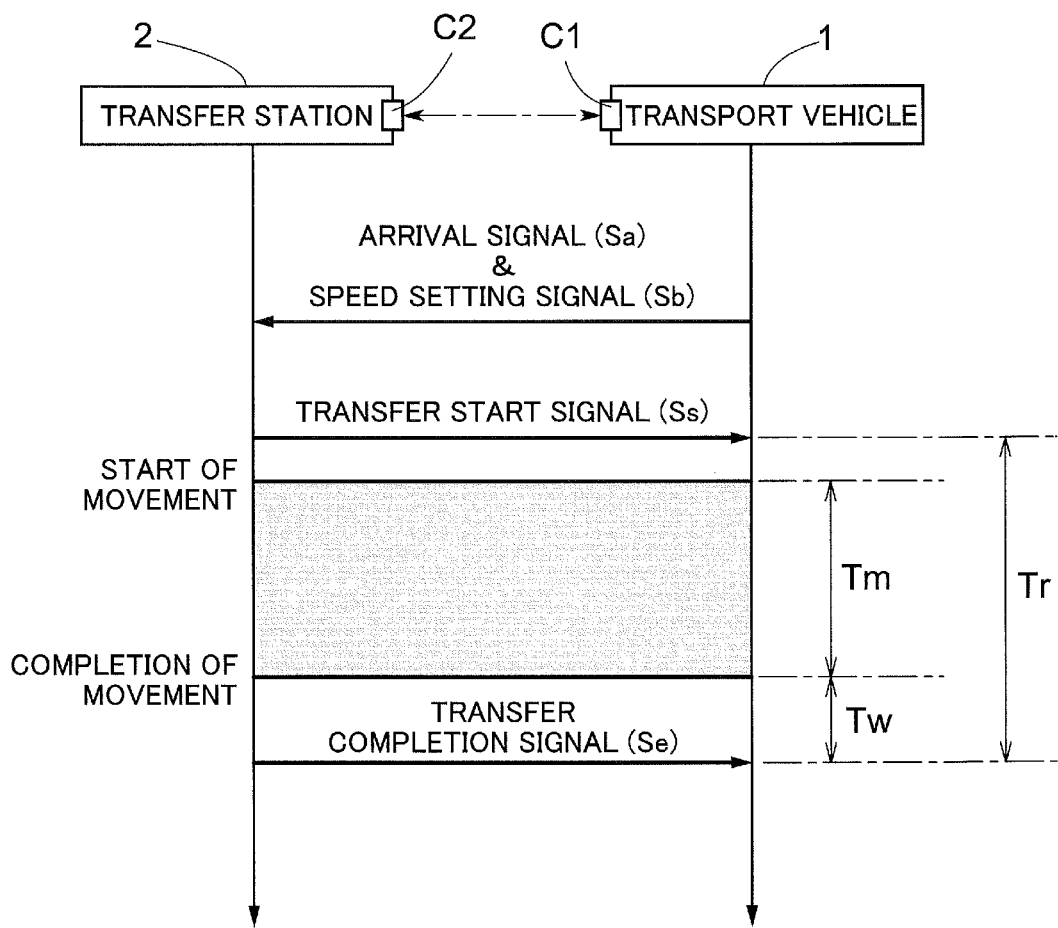

ARTICLE TRANSPORT FACILITY

CROSS-REFERENCE TO RELATED APPLICATIONS

This application is the United States national phase of International Application No. PCT/JP2021/008114 filed Mar. 3, 2021, and claims priority to Japanese Patent Application No. 2020-098362 filed Jun. 5, 2020, the disclosures of which are hereby incorporated by reference in their entireties.

BACKGROUND OF THE INVENTION

Field of the Invention

The present invention relates to an article transport facility including a plurality of transport vehicles that travel along a predetermined travel path.

Description of Related Art

An example of such an article transport facility is disclosed in JP 2004-123350A (Patent Document 1). In the following, the reference numerals shown in parentheses in the description of the background art are those of Patent Document 1.

FIG. 7 of Patent Document 1 shows a configuration in which a plurality of transport vehicles (13) that travel along a loop-shaped travel path (12) transfer articles (4) to and from another logistics equipment (M) at a plurality of locations on the travel path (12), and transport the articles (4) to various portions of the facility. The article transport facility disclosed in Patent Document 1 is operated according to the operational busyness in the facility by changing the setting of the traveling speed of the transport vehicles (13). For example, in a quiet period in which a relatively small number of articles (4) are shipped/received, the traveling speed of the transport vehicles (13) is set to be low, thus reducing the power consumption.

PATENT DOCUMENT

Patent Document 1: JP 2004-123350A

However, when the operation is to be performed according to the busyness of the facility by changing the setting of the traveling speed of the transport vehicles (13), cooperation with other transport vehicles (13) that travel along the same travel path, including, for example, the setting of an inter-vehicle distance with the other transport vehicles (13), needs to be carried out appropriately. Therefore, the setting needs to be changed for many control items relating to cooperation with the other transport vehicles (13). For such a reason, changing the setting of the traveling speed of the transport vehicles (13) according to the operational busyness would impose a significant burden of changing the control setting on the facility as a whole, and is therefore difficult to perform frequently.

SUMMARY OF THE INVENTION

In view of the above-described circumstances, it is desirable to realize an article transport facility that can be operated according to the operational busyness in the facility, and minimize the number of control items for which the setting needs to be changed in response to a change in the operation mode.

An article transport facility according to the present disclosure includes:

a plurality of transport vehicles configured to travel along a predetermined travel path and each including a first transferrer configured to transfer a target article;

transfer stations installed at a plurality of locations adjacent to the travel path;

a second transferrer included in on each of the plurality of transfer stations and configured to transfer the target article to and from each of the first transferrers; and a transfer operation control unit configured to control a transfer operation when transferring the target article between each of the first transferrers and each of the second transferrers, wherein the transfer operation control unit changes, according to an operating state index indicating a level of an operating state of the plurality of transport vehicles present on the travel path, a setting of the transfer operation such that a required transfer time from start to completion of the transfer operation is increased as the level of the operating state is reduced, while maintaining at least one setting of a traveling speed of the transport vehicles.

With the present configuration, in each of the transfer stations, the time (required transfer time) required for the transfer operation of the target article performed between the first transferrer of the transport vehicle and the second transferrer of the transfer station is increased as the level of the operating state is reduced. Therefore, when the level of the operating state of the transport vehicles is low, it is possible to increase the time for the transport vehicles to stop on the travel path for the transfer operation performed at each of the transfer stations. Accordingly, the time for each of the transport vehicles to arrive at the next transfer station is increased, and it is thus possible to increase the possibility that another target article can be received at a transfer station present on the downstream side. Therefore, the ratio of the distance by which a target article is transported, relative to the travel distance of each of the transport vehicles can be increased, and it is thus possible to increase the operation rate of the transport vehicle. In addition, the travel distance of each of the transport vehicles within a certain period can also be reduced, and therefore it is also possible to reduce the energy consumption of the article transport facility. In this manner, with the present configuration, the article transport facility can be appropriately operated according to the operational busyness in the facility. The change of the control setting for realizing such an operation is achieved by changing the setting of the transfer operation so as to increase the required transfer time as the level of the operating state is reduced, while maintaining the setting of the traveling speed of the transport vehicle. This can reduce the necessity to change the control items for cooperation with another transport vehicle, including, for example, a setting of an inter-vehicle distance, and it is thus possible to minimize the number of control items that are needed to be changed in response to a change in the operation mode. Therefore, it is also easy to frequently change the operation mode.

Further features and advantages of the present disclosure will become apparent from the following description of illustrative and non-limiting embodiments with reference to the drawings.

BRIEF DESCRIPTION OF THE DRAWINGS

FIG. 4 is a flowchart illustrating a processing procedure executed by a transfer operation control unit.

FIG. 5 is a time chart illustrating processing executed between a transfer station and a transport vehicle.

DESCRIPTION OF THE INVENTION

First Embodiment

A first embodiment of the article transport facility will be described with reference to the drawings.

Figure 1:
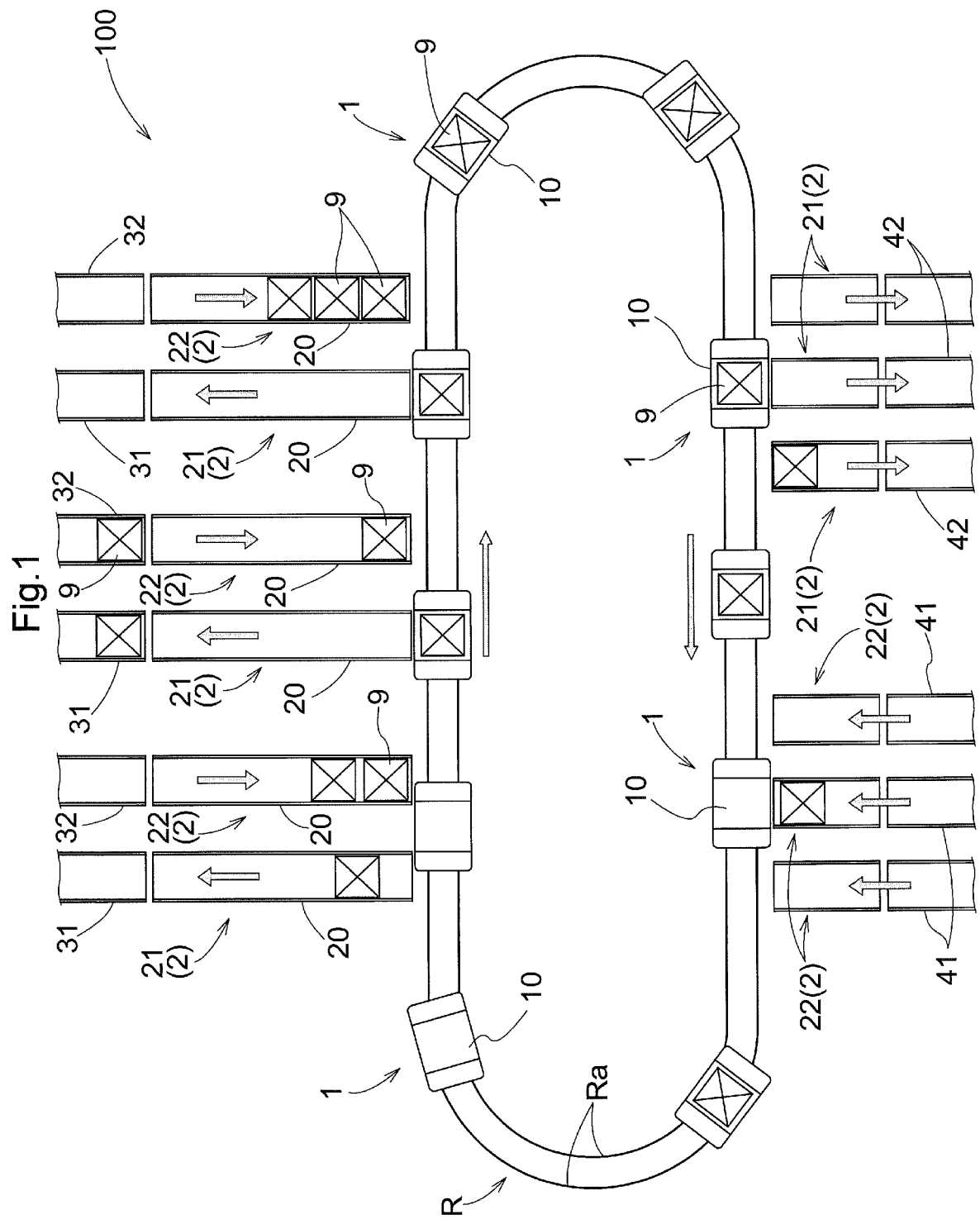
FIG. 1 is a plan view of an article transport facility.

As shown in FIG. 1, an article transport facility 100 includes: a plurality of transport vehicles 1 configured to travel along a predetermined travel path R and each including a first transferrer 10 configured to transfer a target article 9; transfer stations 2 installed at a plurality of locations adjacent to the travel path R; and a second transferrer 20 included in each of the plurality of transfer stations 2 and configured to transfer the target article 9 to and from each of the first transferrers 10.

In the present embodiment, the article transport facility 100 includes receiving sections 41 that transport target articles 9 that are received from the outside of the article transport facility 100 to the inside thereof, an automatic warehouse (not shown) that stores the received target articles 9, and shipping sections 42 that transport the target articles 9 that are to be shipped from the inside of the article transport facility 100 to the outside thereof. The receiving sections 41 and the shipping sections 42 are each formed by a known conveyor such as a roller conveyor and a belt conveyor.

Each transport vehicle 1 travels along the travel path R to transport the target article 9 to and from the plurality of transfer stations 2. In the present example, the travel path R is a closed path, and the transport vehicle 1 is configured to circle along the travel path R. In the illustrated example, the travel path R is formed in an annular shape. However, the travel path R may be a closed path having a polygonal shape, for example, or a path having the shape of a line (a straight line or a curved line) along which the transport vehicle 1 can reciprocate. Alternatively, the travel path R may be a branched path having one or more branched portions. In the present embodiment, the travel path R is formed by a pair of rails Ra, and the transport vehicle 1 is configured to travel along the travel path R using wheels that roll on the pair of rails Ra.

Some of the plurality of transfer station 2 serve as receiving stations 21 that receive the target articles 9 from the transport vehicles 1, and others of the plurality of transfer stations 2 serve as delivery stations 22 that deliver the target articles 9 to the transport vehicles 1. That is, in the present example, the article transport facility 100 include a plurality of receiving stations 21 and a plurality of delivery stations 22.

In the present embodiment, some of the plurality of delivery stations 22 are connected to the receiving sections 41 described above. The remainder of the plurality of delivery stations 22 are connected to retrieval sections 32 that retrieve the target article 9 from the automatic warehouse (not shown). On the other hand, some of the plurality of receiving stations 21 are connected to the shipping sections 42 described above. The remainder of the plurality of receiving stations 21 are connected to storage sections 31 that store the target article 9 into the automatic warehouse.

When a target article 9 is received into the automatic warehouse (not shown), the target article 9 is delivered to a receiving section 41 from the outside of the article transport facility 100, and is transported from the receiving section 41 to a delivery station 22 connected to the receiving section 41. Then, the target article 9 is delivered from the delivery station 22 to the transport vehicle 1. The transport vehicle 1 that has received the target article 9 travels along the travel path R to transport the target article 9 to one of the plurality of receiving stations 21 that is connected to the automatic warehouse (not shown) as a transport destination. The receiving station 21 receives the target article 9 from the transport vehicle 1, and transports the target article 9 to a storage section 31 connected to the receiving station 21. The storage section 31 that has received the target article 9 transports the target article 9 to the automatic warehouse (not shown). The target article 9 that has been transported to the automatic warehouse is stored in the automatic warehouse until the target article 9 is retrieved.

When a target article 9 is shipped from the automatic warehouse (not shown), the target article 9 is delivered to a retrieval section 32 from the automatic warehouse (not shown), and is transported from the retrieval section 32 to a delivery station 22 connected to the retrieval section 32. Then, the target article 9 is delivered to the transport vehicle 1 from the delivery station 22. The transport vehicle 1 that has received the target article 9 travels along the travel path R to transport the target article 9 to one of the plurality of receiving stations 21 that is connected to a shipping section 42 as a transport destination. The receiving station 21 receives the target article 9 from the transport vehicle 1, and transports the target article 9 to a shipping section 42 connected to the receiving station 21. Then, the target article 9 is shipped to the outside of the article transport facility 100 by the shipping section 42.

There may also be cases where a target article 9 is moved between a plurality of automatic warehouses (not shown). When a target article 9 is retrieved from a first automatic warehouse (not shown) and received into a second automatic warehouse (not shown), the target article 9 is delivered to a retrieval section 32 from the first automatic warehouse (not shown), and transported from the retrieval section 32 to a delivery station 22 connected to the retrieval section 32. Then, the target article 9 is delivered to a transport vehicle 1 from the delivery station 22. The transport vehicle 1 that has received the target article 9 travels along the travel path R to transport the target article 9 to one of the plurality of receiving stations 21 that is connected to the second automatic warehouse (not shown) as a transport destination. The receiving station 21 receives the target article 9 from the transport vehicle 1, and transports the target article 9 to a storage section 31 connected to the receiving station 21. The storage section 31 that has received the target article 9 transports the target article 9 to the second automatic warehouse (not shown).

In the present embodiment, each transport vehicle 1 is a tracked automated guided vehicle. As described above, a plurality of transport vehicles 1 are configured to circle along the same travel path R formed by the pair of rails Ra. In the illustrated example, ten transport vehicles 1 are present on the travel path R.

Each transport vehicle 1 is configured to transport the target article 9 to and from a plurality of transfer stations 2.

In an actual transporting state in which the transport vehicle 1 is transporting a target article 9, the transport vehicle 1 travels toward a receiving station 21 (transfer station 2) designated as a transport destination of the target article 9, and stops at a position adjacent to the receiving station 21. Then, the target article 9 is transferred from the transport vehicle 1 to the receiving station 21. That is, the receiving station 21 receives the target article 9 from the transport vehicle 1.

In an empty transporting state in which the transport vehicle 1 is not transporting the target article 9, the transport vehicle 1 travels toward a delivery station 22 (transfer station 2) designated as a transport source of the target article 9, and stops at a position adjacent to the delivery station 22. Then, the target article 9 is transferred from the delivery station 22 to the transport vehicle 1. That is, the delivery station 22 delivers the target article 9 to the transport vehicle 1.

Figure 2:
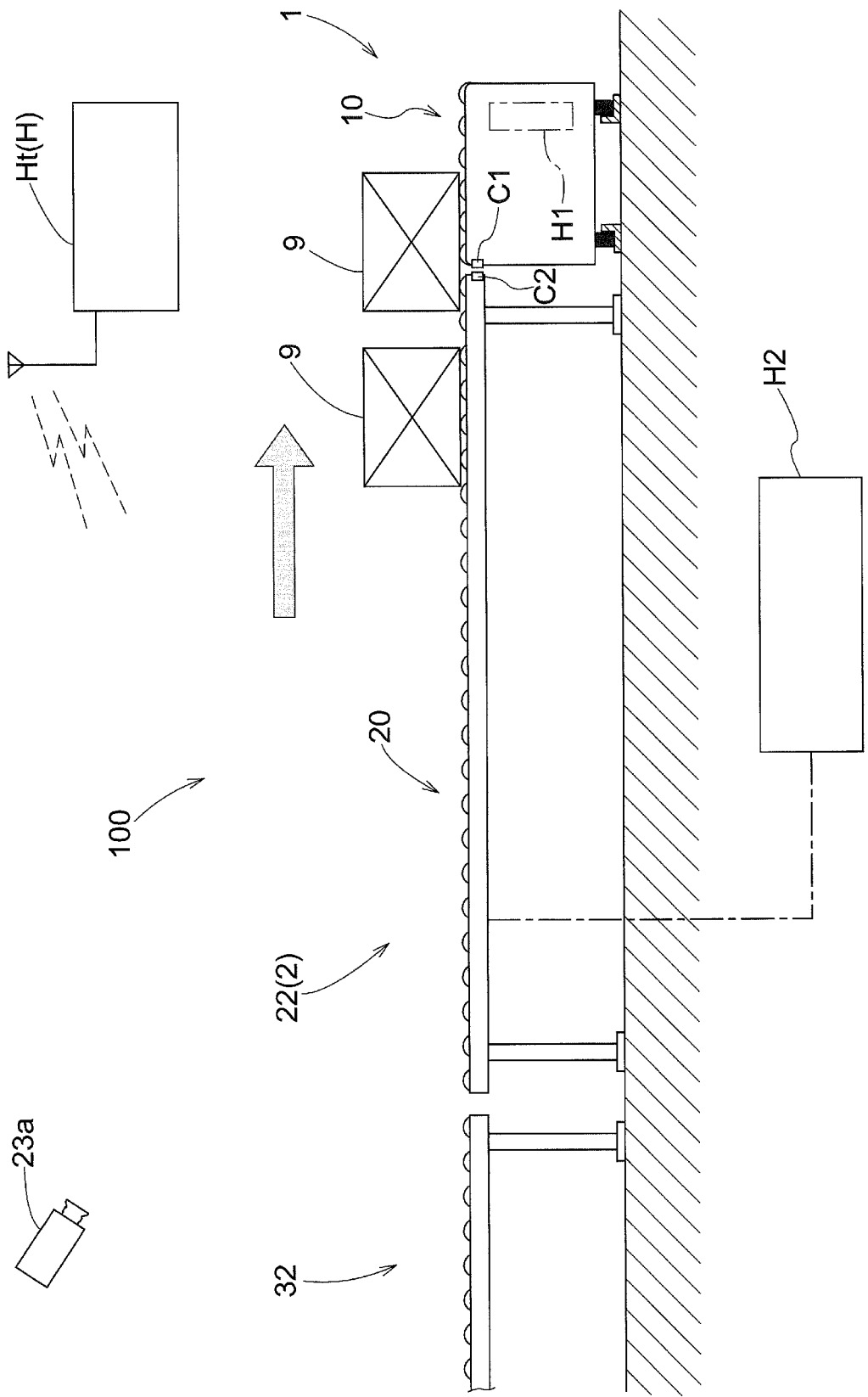
FIG. 2 is a diagram showing a transfer operation of a target article at a transfer station.

FIG. 2 shows how a target article 9 is transferred between a transport vehicle 1 and a transfer station 2, and more particularly shows how a delivery station 22 delivers a target article 9 to a transport vehicle 1. As described above, the transfer of a target article 9 between a transport vehicle 1 and a transfer station 2 is carried out by the first transferrer 10 included in the transport vehicle 1 and the second transferrer 20 included in the transfer station 2. The first transferrer 10 and the second transferrer 20 are configured to move the target article 9. In the illustrated example, the first transferrer 10 and the second transferrer 20 are each formed as a roller conveyor, and move a target article 9 while the target article 9 is placed thereon.

Figure 3:
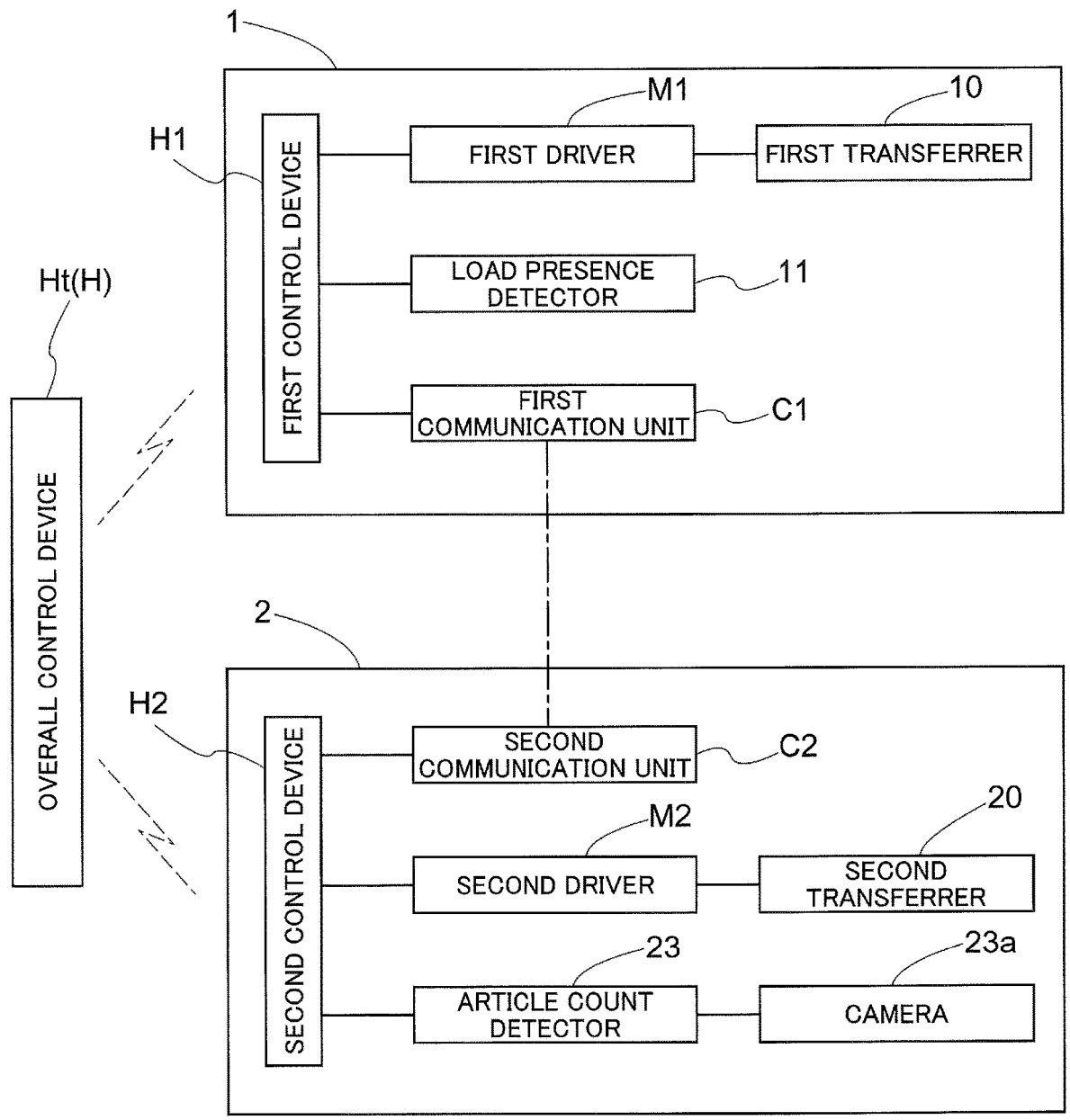
FIG. 3 is a control block diagram of the article transport facility.

As shown in FIGS. 2 and 3, the article transport facility 100 includes an overall control device Ht that manages the entire facility. Each transport vehicle 1 includes a first control device H1 that controls the operation of the transport vehicle 1. Each transfer station 2 includes a second control device 112 that controls the operation of the transfer station 2. The overall control device Ht, the first control device H1, and the second control device 112 each include, for example, a processor such as a microcomputer, and a peripheral circuit such as a memory. Various functions are implemented by these pieces of hardware working in cooperation with a program executed on a processor such as a computer.

The overall control device Ht, the transport vehicle 1 (first control device H1), and the transfer station 2 (second control device 112) are configured to be capable of communicating with each other. The overall control device Ht transmits, to the transport vehicle 1, a transport instruction to transport a target article 9 between a plurality of transfer stations 2. The transport instruction designates a transfer station 2 as a transport source of the target article 9, and a transfer station 2 as a transport destination of the target article 9. The transport vehicle 1 that has received the transport instruction travels toward the transfer station 2 as the transport source to receive the target article 9 from the transfer station 2 as the transport source, and thereafter travels toward the transfer station 2 as the transport destination to deliver the target article 9 to the transfer station 2 as the transport destination.

In the present embodiment, each transport vehicle 1 includes a first driver M1 that drives the first transferrer 10, a load presence detector 11 for detecting that the first transferrer 10 holds the target article 9, or in other words, that the transport vehicle 1 is in the actual transporting state, and a first communication unit C1 that transmits and receives a signal to and from a second communication unit C2 (described later) of a transfer station 2. For example, the load presence detector 11 is formed using a weight-measuring sensor capable of measuring the weight of a target article 9, a limit switch that is actuated when a target article 9 is present, an optical sensor, or the like.

The first control device H1 controls the actuation, stop, and operating speed of the first transferrer 10 by controlling the first driver M1. The first control device H1 acquires, from the load presence detector 11, information as to whether or not the first transferrer 10 holds a target article 9, or in other words, information as to whether or not the transport vehicle 1 is in the actual transporting state. The first control device H1 exchanges the information with the transfer station 2 via the first communication unit C1.

In the present embodiment, each transfer station 2 includes a second driver M2 that drives the second transferrer 20, an article count detector 23 for detecting the number of target articles 9 held by the second transferrer 20, and a second communication unit C2 that transmits and receives a signal to and from the first communication unit C1 of the transport vehicle 1. In the present example, the article count detector 23 detects the number of target articles 9 held by the second transferrer 20, based on image data captured by a camera 23a that captures an image of any target article 9 present on the second transferrer 20.

The second control device 112 controls the actuation, stop, and operating speed of the second transferrer 20 by controlling the second driver M2. The second control device 112 acquires, from the article count detector 23, information of the number (including 0) of target articles 9 held by the second transferrer 20. The second control device 112 exchanges the information with the transport vehicle 1 via the second communication unit C2.

As described above, the transport vehicle 1 and the transfer station 2 perform a transfer operation of a target article 9. The transport vehicle 1 and the transfer station 2 are configured to perform a transmission and reception process for transmitting and receiving therebetween a signal in the transfer operation of target article 9. That is, in the present embodiment, as shown in FIG. 5, the transfer operation includes a transmission and reception process in which the transport vehicle 1 and the transfer station 2 transmit and receive therebetween signals, including a transfer start signal Ss indicating the start of the transfer operation, and a transfer completion signal Se indicating the completion of the transfer operation. After the transfer start signal Ss has been transmitted and received between the transport vehicle 1 and the transfer station 2, movement of the target article 9 is started. After the movement of the target article 9 has been completed, the transfer completion signal Se is transmitted and received. In this manner, in the present embodiment, the transport vehicle 1 and the transfer station 2 are configured to perform transmission and reception of the transfer start signal Ss before start of movement of the target article 9 performed by the transfer operation, and perform transmission and reception of the transfer completion signal Se after completion of movement of the target article 9 performed by the transfer operation. Here, the transport vehicle 1 and the transfer station 2 perform the transmission and reception process using the first communication unit C1 and the second communication unit C2.

In the present embodiment, the transport vehicle 1 and the transfer station 2 are configured to transmit and receive therebetween a speed setting signal Sb indicating a set value of a movement speed of the target article 9, before start of movement of the target article 9 performed by the transfer operation. As the set value of the movement speed, it is possible to set, for example, a medium-speed value, which is a set value for moving the target article 9 at a medium speed, a low-speed value, which is a set value for moving the target article 9 at a speed lower than the medium speed, and a high-speed value, which is a set value for moving the target article 9 at a speed higher than the medium speed. The first transferrer 10 and the second transferrer 20 move the target article 9 in the transfer operation at a speed according to the set value of the speed setting signal Sb. In the present example, the first transferrer 10 and the second transferrer 20 move the target article 9 at a medium speed in response to the speed setting signal Sb indicating the medium-speed value, move the target article 9 at a low speed in response to the speed setting signal Sb indicating the low-speed value, and move the target article 9 at a high speed in response to the speed setting signal Sb indicating the high-speed value.

The operation mode of the article transport facility 100 is changed according to the operating state of a plurality of transport vehicles 1 that are present on the travel path R. For example, in a busy period in which a relatively large number of target articles 9 are shipped/received, the operation mode is set to an operation mode in which the number of target articles 9 that can be transported per certain time period is large, so as to deal with a situation where the target articles 9 are frequently transported in the facility. For example, in a quiet period in which a relatively small number of target articles 9 are shipped/received, the operation mode is set to an operation mode in which the facility is operated with a capacity suitable for such a small number of articles to be transported, so as to deal with a situation where the target articles 9 are not frequently transported in the facility.

As shown in FIGS. 2 and 3, the article transport facility 100 includes a transfer operation control unit H that controls the transfer operation when transferring the target article 9 between the first transferrer 10 and the second transferrer 20. In the present embodiment, the overall control device Ht corresponds to the transfer operation control unit H. The technical features of the article transport facility 100 disclosed herein are also applicable to a control method of the article transport facility 100, and a control method of the article transport facility 100 is also disclosed herein. The control method includes a step in which the transfer operation control unit H changes the setting of the transfer operation. In addition, the control method also includes a step in which the transfer operation control unit H executes various types of processing (steps) shown in FIG. 4.

The transfer operation control unit H changes, according to an operating state index indicating the level of the operating state of a plurality of transport vehicles 1 present on the travel path R, the setting of the transfer operation such that a required transfer time Tr (see FIG. 5) from start to completion of the transfer operation is increased as the level of the operating state is reduced, while maintaining the setting of the traveling speed of the transport vehicle 1. That is, at each of the transfer stations 2, the transfer operation control unit H increases the required transfer time Tr required for the transfer operation of the target article 9 performed between the first transferrer 10 of the transport vehicle 1 and the second transferrer 20 of the transfer station 2 as the level of the operating state is reduced, by changing the setting of the transfer operation.

In this manner, increasing the required transfer time Tr can increase the time period for the transport vehicle 1 to stop on the travel path R for the transfer operation performed at each of the transfer station 2. Accordingly, when a target article 9 is delivered to a designated transfer station 2 from a transport vehicle 1, the time period for the transport vehicle 1 to reach the next transfer station 2 is increased. Therefore, it is possible to increase the possibility that the transport vehicle 1 can receive another target article 9 at a transfer station 2 located downstream in the transport direction. In addition, the time period for another transport vehicle 1 (following vehicle) present upstream of the transport vehicle 1 (preceding vehicle) in the transport direction to reach the next transfer station 2 is also increased. Accordingly, when a transport vehicle 1 (following vehicle) is traveling in an empty state in which the transport vehicle 1 is not transporting any target article 9, it is also possible to increase the possibility that the transport vehicle 1 (following vehicle) can receive a target article 9 at the next transfer station 2, or another transfer station 2 present further downstream in the transport direction. Therefore, even in the quiet period, the facility can be efficiently operated according to a small number of articles to be transported. The change of the control setting for realizing such an operation is achieved by changing the setting of the transfer operation so as to vary the required transfer time Tr, while maintaining the setting of the traveling speed of the transport vehicle 1. This can reduce the necessity to change the control items for cooperation with another transport vehicle 1, including, for example, a setting of an inter-vehicle distance, and it is thus possible to minimize the number of control items that are needed to be changed in response to a change in the operation mode. Therefore, it is easy to frequently change the operation mode according to the operational busyness in the article transport facility 100.

Here, the above-described setting of the traveling speed of the transport vehicle 1 includes a setting of a maximum speed of the transport vehicle 1 while traveling. That is, even when changing the operation mode, the transfer operation control unit H maintains the setting of the maximum speed of the transport vehicle 1 while traveling. In the present example, the setting of the speed of the transport vehicle 1 includes, in addition to the above-described setting of the maximum speed, a setting of an acceleration and a setting of a deceleration. In the case where the traveling speed is increased, for example, where the transport vehicle 1 starts to travel from the stopped state, the transport vehicle 1 is accelerated at a set acceleration. After reaching a set maximum speed, the transport vehicle 1 travels at the maximum speed. In the case where the traveling speed is reduced, for example, where the transport vehicle 1 stops at a set stop position, the transport vehicle 1 is decelerated at a set deceleration. In the case where the transport vehicle 1 is to be stopped at the stop position, the transport vehicle 1 is decelerated such that its speed reaches zero at the stop position. In the present embodiment, when changing the operation mode, the transfer operation control unit H maintains the settings of the acceleration, the maximum speed, and the deceleration of the transport vehicle 1.

In the present embodiment, a minimum inter-vehicle distance for preventing collision with the preceding transport vehicle 1 is set between the plurality of transport vehicles 1. Therefore, when changing the operation mode, the transfer operation control unit H also maintains the minimum inter-vehicle distance between the plurality of transport vehicles 1. Accordingly, even when the setting of the maximum speed of the transport vehicle 1, as well as the settings of the acceleration and the deceleration of the transport vehicle 1 are maintained, it is possible to cause a transport vehicle 1 to stop with an appropriate inter-vehicle distance, while preventing the transport vehicle 1 from colliding with another transport vehicle 1. That is, even when the setting of the transfer operation has been changed so as to increase the required transfer time Tr, it is possible to cause the transport vehicle 1 to travel appropriately, while maintaining the settings of the transport vehicle 1, such as the setting of the maximum speed while traveling. For example, transport of a target article 9 by another transport vehicle 1 following the preceding transport vehicle 1 may be performed preferentially over transport of a target article 9 by the preceding transport vehicle 1. In that case, even in a situation where the preceding transport vehicle 1 is performing, for example, preparation for receiving a target article 9 at a transfer station 2, once the distance from the following transport vehicle 1 has reached the minimum inter-vehicle distance, the preceding transport vehicle 1 suspends the receiving preparation and starts to travel. However, the required transfer time Tr for the transport vehicle 1 (following transport vehicle 1), for example, the required transfer time Tr when the transport vehicle 1 receives the target article 9 from the transfer station 2 is increased, thus making it possible to maintain a state in which the inter-vehicle distance from the preceding transport vehicle 1 is long. Accordingly, it is possible to prevent suspension of the preparation for receiving the target article 9 performed by the preceding transport vehicle 1 as in the above described case. Therefore, it is possible to increase the possibility that the preceding transport vehicle 1 can receive the target article 9 at the transfer station 2.

In the present embodiment, the operating state index is an index, determined, based on an operation rate of the plurality of transport vehicles 1 present on the travel path R, in such a manner as to indicate the operating state such that the level of the operating state is reduced as the operation rate is reduced. The operation rate of a transport vehicle 1 is an index representing the ratio at which the transport vehicle 1 is operating. Various known methods can be used as the method for deriving such an operation rate of the transport vehicle 1. For example, the operation rate of the transport vehicle 1 can be determined using the average value over a certain period of the numbers of transport vehicles 1 that are in the actual transporting state, relative to the number of all the transport vehicles 1 present on the travel path R. Alternatively, the operation rate of the transport vehicle 1 can be determined using a value obtained by averaging the ratios of the time periods during which each of the transport vehicles 1 is in the actual transporting state for all the transport vehicles 1 over a certain time period. The operation rate determined by any of these methods has any value from 0 to 100%.

As described above, the first control device H1 of the transport vehicle 1 acquires, from the load presence detector 11, information as to whether or not the first transferrer 10 holds any target article 9, or in other words, information as to whether or not the transport vehicle 1 is in the actual transporting state. In the present embodiment, the transfer operation control unit H acquires results of detection by the load presence detectors 11 from all the transport vehicles 1 (the first control devices H1) present on the travel path R. Then, the transfer operation control unit H acquires, at each time point, information of the number of all the transport vehicles 1 present on the travel path R, and information of the number of transport vehicles 1 that are in the actual transporting state. Such acquisition of information corresponds to operating state acquisition processing (#1) shown in FIG. 4. Then, the transfer operation control unit H accumulates the information acquired in this manner for a certain period (e.g., one hour), and determines the operation rate of the transport vehicles 1 from the accumulated information. The transfer operation control unit H defines the operating state index based on the thus derived operation rate of the transport vehicles 1. In the present embodiment, the operation rate of the transport vehicles 1 is directly used as the operating state index. Therefore, such processing for determining the operation rate of the transport vehicles 1 and using the operation rate as the operating state index corresponds to operating state index generation processing (#2) shown in FIG. 4. Thereafter, the transfer operation control unit H sets the transfer operation based on the operating state index (#3). Then, the transfer operation control unit H generates a transfer instruction including the setting content of the transfer operation that has been set based on the operating state index.

In the present embodiment, the transfer operation control unit H changes the setting of the transfer operation such that the movement speed of the target article 9 in the transfer operation is reduced as the level of the operating state is reduced. Then, the transfer operation control unit H generates a transfer instruction including a setting of the transfer operation, such as a setting to reduce the movement speed of the target article 9. In the present embodiment, as described above, the transport vehicle 1 and the transfer station 2 are configured to transmit and receive therebetween the speed setting signal Sb indicating a set value of the movement speed of the target article 9 when being transferred. Therefore, the transfer operation control unit H sets the movement speed indicated by the speed setting signal Sb such that the movement speed is reduced as the level of the operating state is reduced. Accordingly, the setting of the transfer operation is changed so as to vary the movement speed of the target article 9 in the transfer operation.

In the present embodiment, as described above, three steps of speed, namely, the high-speed value, the medium-speed value, and the low-speed value can be set as the set value of the movement speed of the target article 9. Therefore, the transfer operation control unit H sets the transfer operation based on an operating state index such that the set value of the movement speed of the target article 9 is the "high-speed value" when the level of the operating state of the transport vehicle 1 indicated by the operating state index is high, the set value of the movement speed of the target article 9 is the "medium-speed value" when the level of the operating state is medium, and the set value of the movement speed of the target article 9 is the "low-speed value" when the level of the operating state is low. Here, since the operation rate of the transport vehicles 1 is directly used as the operating state index, the transfer operation control unit H, for example, can determine that the level of the operating state is high when the operation rate of the transport vehicle 1 is 60% or more and 100% or less, determine that the level of the operating state is medium when the operation rate of the transport vehicle 1 is 30% or more and less than 60%, and determine that the level of the operating state is low when the operation rate of the transport vehicle 1 is 0% or more and less than 30%. In this manner, it is possible to vary the required transfer time Tr by varying the movement speed of the target article 9. Thus, it is possible to increase the required transfer time Tr as the level of the operating state of the transport vehicles 1 is reduced.

A flow of an operation performed when a target article 9 is transferred between a transport vehicle 1 and a transfer station 2 will be described with reference to the time chart of FIG. 5.

First, the transport vehicle 1 travels to a designated transfer station 2 in accordance with a transport instruction from the overall control device Ht, and stops at a position adjacent to the transfer station 2. As described above, the transfer operation control unit H generates an operating state index based on the information on the transport vehicles 1 present on the travel path R, sets the transfer operation based on the operating state index, and generates a transfer instruction including the setting content of the transfer operation (see FIG. 4). In the present example, the overall control device Ht corresponds to the transfer operation control unit H, and the overall control device Ht transmits, to the transport vehicle 1, a transfer instruction together with the transport instruction.

The transport vehicle 1 that has arrived at the transfer station 2 designated in the transport instruction transmits, to the transfer station 2, an arrival signal Sa indicating the arrival. Transmission and reception between the transport vehicle 1 and the transfer station 2 are carried out using the first communication unit C1 and the second communication unit C2. In the present embodiment, the transport vehicle 1 transmits, to the transfer station 2, a speed setting signal Sb together with the arrival signal Sa. The speed setting signal Sb is a signal indicating a set value of the movement speed of the target article 9 in the transfer operation. The speed setting signal Sb is included in the transfer instruction generated by the transfer operation control unit H. That is, as described above, the transfer instruction includes the setting content of the transfer operation that has been set based on the operating state index, and the setting content of the transfer operation includes the set value of the movement speed of the target article 9 in the transfer operation. In the present embodiment, as described above, the set value of the movement speed is one of the "high-speed value", the "medium-speed value", and the "low-speed value", and is set so as to reduce stepwise the movement speed of the target article 9 in the transfer operation as the level of the operating state of the transport vehicle 1 is reduced.

After receiving the arrival signal Sa from the transport vehicle 1, the transfer station 2 permits transfer of the target article 9 to and from the transport vehicle 1 if the transfer station 2 is in a state in which transfer of the target article 9 is possible, and transmits a transfer start signal Ss to the transport vehicle 1. After transmission/receival of the transfer start signal Ss has been carried out, movement of the target article 9 by the transfer operation is started. The movement speed of the target article 9 at this time is set in accordance with the set value shared between the transport vehicle 1 and the transfer station 2 through the transmission/receival of the speed setting signal Sb. The movement time Tm required from start to completion of movement of the target article 9 is increased as the setting of the movement speed is reduced. After movement of the target article 9 has been completed, the transfer station 2 transmits a transfer completion signal Se to the transport vehicle 1 after a predetermined waiting time Tw. Here, the waiting time Tw may have either a constant value or a variable value. In the present embodiment, the waiting time Tw has a constant value. The transport vehicle 1 starts to travel in response to reception of the transfer completion signal Se from the transfer station 2 as a trigger. Consequently, the transport vehicle 1 leaves the transfer station 2 and travels toward the next transfer station 2.

Second Embodiment

Next, a second embodiment of the article transport facility will be described. The same drawings as those of the above first embodiment will be referred to. The following description focuses on differences from the above first embodiment. The aspects that are not specifically described are the same as those of the above first embodiment.

In the present embodiment, one or more or all of the plurality of transfer stations 2 are each provided with an article count detector 23 for detecting the number of target articles 9 held by the transfer station 2. In the present example, of the receiving station 21 and the delivery station 22, only the delivery station 22, which delivers the target article 9 to the transport vehicle 1, is provided with the article count detector 23. Accordingly, the number of held target articles 9 can be detected at the delivery station 22 where a plurality of target articles 9 waiting to be transported by the transport vehicle 1 may be accumulated.

In the present embodiment, the operating state index is an index determined based on the number of target articles 9 detected by the article count detector 23 such that the level of the operating state indicated by the operating state index is reduced as the aforementioned number is reduced. In the present example, the operating state index is determined based on the total (hereinafter referred to as an "accumulated article count") of the numbers of held target articles 9 detected by the article count detectors 23 of all the delivery stations 22 included in the article transport facility 100. Here, the accumulated article count is directly used as the operating state index. The accumulated article count corresponds to the number of target articles 9 that need to be transported by the transport vehicles 1. When the accumulated article count is large, it can be determined that the facility is in a busy period in which a larger number of target articles 9 need to be transported by the transport vehicles 1. Conversely, when the accumulated article count is small, it can be determined that the facility is in a quiet period in which the number of target articles 9 that need to be transported by the transport vehicles 1 is small. That is, the accumulated article count serves as an index indirectly indicating the level of the operating state of the transport vehicles 1.

In the present embodiment, for example, two steps of time, namely, a first time value and a second time value (a time value longer than the first time value) can be set as the set value of the waiting time Tw. In this case, the transfer operation control unit H sets the transfer operation based on an operating state index such that the set value of the waiting time Tw is the "first time value" when the level of the operating state of the transport vehicle 1 indicated by the operating state index is high, and the set value of the waiting time Tw is the "second time value" when the level of the operating state is low. In this manner, in the present embodiment, the required transfer time Tr is varied by varying the waiting time Tw. In addition to the waiting time Tw, the movement speed of the target article 9 can also be varied. For example, two steps of speed, namely, a high-speed value and a low-speed value can be set as the set value of the movement speed of the target article 9. In this case, the transfer operation control unit H sets the transfer operation based on an operating state index such that the set value of the movement speed of the target article 9 is the "high-speed value" when the level of the operating state of the transport vehicle 1 indicated by the operating state index is high, and the set value of the movement speed of the target article 9 is the "low-speed value" when the level of the operating state is low. Here, since the accumulated article count is directly used as the operating state index, the transfer operation control unit H can, for example, determine that the level of the operating state is high when the accumulated article count is 10 or more, and determine that the level of the operating state is low when the accumulated article count is 9 or less. In the present embodiment as well, the required transfer time Tr can be varied by varying the waiting time Tw, or varying the movement speed of the target article 9 in addition to the waiting time Tw. Thus, the required transfer time Tr can be increased as the level of the operating state of the transport vehicle 1 is reduced.

In the present embodiment, the second control device H2 of the transfer station 2 corresponds to the transfer operation control unit H. The second control device H2 uses all the article count detectors 23 included in the article transport facility 100 to acquire information of the accumulated article count, generates an operating state index based on the information, sets the transfer operation based on the operating state index, and generates a transfer instruction including the setting content of the transfer operation (see FIG. 4). Then, the second control device H2 (transfer station 2) transmits the transfer instruction to the first control device H1 (transport vehicle 1) via the second communication unit C2 and the first communication unit C1. At this time, in the present embodiment, after the transport vehicle 1 has transmitted an arrival signal Sa to the transfer station 2, the transfer station 2 transmits a signal based on the transfer instruction to the transport vehicle 1, contrary to the example shown in FIG. 5. In the present embodiment, this signal is a waiting time signal indicating the length of the waiting time Tw.

That is, although the movement speed of the target article 9 is set to be reduced in the above first embodiment such that the required transfer time Tr is increased as the level of the operating state is reduced, the transfer operation control unit H in the present embodiment changes the setting of the transfer operation so as to increase a period (hereinafter the length of this period is referred to as a "waiting time Tw") until the transfer completion signal Se is transmitted after completion of movement of the target article 9 by the transfer operation, in order to increase the required transfer time Tr as the level of the operating state is reduced. Then, the transfer operation control unit H generates a transfer instruction to delay the timing of transmission of the transfer completion signal Se so as to increase the waiting time Tw. Accordingly, the required transfer time Tr until the completion of the transfer operation can be a period longer than the period (hereinafter the length of this period is referred to as a "movement time Tm") from start to completion of movement of the target article 9 by the transfer operation. Note that in the present embodiment, the movement speed of the target article 9 during the transfer operation may have either a constant value or a variable value. In the present embodiment, the movement speed of the target article 9 has a constant value.

As shown in FIG. 5, the required transfer time Tr includes the movement time Tm of the target article 9 associated with the transfer operation, and the waiting time Tw until the transfer completion signal Se is transmitted after completion of movement of the target article 9 by the transfer operation. The required transfer time Tr is increased by increasing either one of the movement time Tm and the waiting time Tw. In the present embodiment, the waiting time Tw is increased as the level of the operating state is reduced. This makes it possible to increase the required transfer time Tr. Note that in the above first embodiment, the movement time Tm is increased as the level of the operating state is reduced, thus making it possible to increase the required transfer time Tr.

Other Embodiments

Next, other embodiments of the article transport facility will be described.

(1) The above first embodiment has described an example in which the overall control device Ht corresponds to the transfer operation control unit H, and the above second embodiment has described an example in which the second control device 112 corresponds to the transfer operation control unit H. However, the present disclosure is not limited to these examples, and the first control device H1 may correspond to the transfer operation control unit H. Alternatively, the transfer operation control unit H may be formed by two or all of the overall control device Ht, the first control device H1, and the second control device H2.

(2) The above first embodiment has described a configuration in which the transfer operation control unit H increases the required transfer time Tr by reducing the movement speed of the target article 9 as the level of the operating state of the transport vehicle 1 is reduced, and the above second embodiment has described a configuration in which the transfer operation control unit H increases the required transfer time Tr by increasing the period (waiting time Tw) until the transfer completion signal Se is transmitted after completion of movement of the target article 9 by the transfer operation as the level of the operating state of the transport vehicle 1 is reduced. However, the present disclosure is not limited thereto, and the required transfer time Tr may be increased by reducing the movement speed of the target article 9 and increasing the waiting time Tw until the transfer completion signal Se is transmitted after completion of movement of the target article 9 by the transfer operation. That is, although, in each of the above embodiments, the setting of the transfer operation is changed so as to increase either one of the movement time Tm and the waiting time Tw as the level of the operating state is reduced, the present disclosure is not limited thereto. The setting of the transfer operation may be changed so as to increase both the movement time Tm and the waiting time Tw.

(3) The above first embodiment has described an example in which the operating state index is an index determined based on the operation rate of a plurality of transport vehicles 1 present on the travel path R. On the other hand, the above second embodiment has described an example in which the operating state index is an index determined based on the accumulated article count detected by the article count detector 23. However, the present disclosure is not limited thereto, and the operating state index may be determined with respect to both the operation rate of a plurality of transport vehicles 1 present on the travel path R and the accumulated article count detected by the article count detector 23. In the case of defining the operating state index with respect to both the operation rate and the accumulated article count, a value obtained, for example, by multiplying each of the operation rate and the accumulated article count by an appropriate weight coefficient, and summing up the resulting values may be used as the operating state index. Alternatively, various indexes either directly or indirectly indicating the level of the operating state of the transport vehicles 1, including, for example, the sum of the number of target articles 9 received into the article transport facility 100 and the number of target articles 9 shipped from the article transport facility 100, may be used as the operating state index.

(4) Each of the above embodiments has described an example in which the first transferrer 10 and the second transferrer 20 are each configured as a roller conveyor. However, the present disclosure is not limited to such an example, and at least one of the first transferrer 10 and the second transferrer 20 may be formed by a known conveyor such as a belt conveyor and a chain conveyor, or may be formed by a known mechanism capable of moving the target article 9, such as a fork mechanism and a hook mechanism.

(5) Each of the above embodiments has described an example in which the transfer operation control unit H changes the setting of the transfer operation so as to increase the required transfer time Tr, while maintaining the settings of the acceleration, maximum speed, and deceleration of the transport vehicle 1. However, the present disclosure is not limited to such an example, and the transfer operation control unit H may change at least one of the acceleration and the deceleration of the transport vehicle 1 when changing the setting of the transfer operation so as to increase the required transfer time Tr while maintaining the setting of the maximum speed of the transport vehicle 1.

(6) Each of the above embodiments has described an example in which the transport vehicle 1 is a tracked automated guided vehicle. However, the present disclosure is not limited to such an example, and the transport vehicle 1 may be a trackless automated guided vehicle. In this case, the transport vehicle 1 may be configured to travel along, for example, magnetic tape installed on a floor surface or the like.

(7) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiments

An outline of the article transport facility described above will be described below.

An article transport facility according to the present disclosure includes:
  a plurality of transport vehicles configured to travel along a predetermined travel path and each including a first transferrer configured to transfer a target article;
  transfer stations installed at a plurality of locations adjacent to the travel path;
  a second transferrer included in on each of the plurality of transfer stations and configured to transfer the target article to and from each of the first transferrers; and
  a transfer operation control unit configured to control a transfer operation when transferring the target article between each of the first transferrers and each of the second transferrers,
  wherein the transfer operation control unit changes, according to an operating state index indicating a level of an operating state of the plurality of transport vehicles present on the travel path, a setting of the transfer operation such that a required transfer time from start to completion of the transfer operation is increased as the level of the operating state is reduced.

With the present configuration, in each of the transfer stations, the time (required transfer time) required for the transfer operation of the target article performed between the first transferrer of the transport vehicle and the second transferrer of the transfer station is increased as the level of the operating state is reduced. Therefore, when the level of the operating state of the transport vehicles is low, it is possible to increase the time for the transport vehicles to stop on the travel path for the transfer operation performed at each of the transfer stations. Accordingly, the time for each of the transport vehicles to arrive at the next transfer station is increased, and it is thus possible to increase the possibility that another target article can be received at a transfer station present on the downstream side. Therefore, the ratio of the distance by which a target article is transported, relative to the travel distance of each of the transport vehicles can be increased, and it is thus possible to increase the operation rate of the transport vehicle. In addition, the travel distance of each of the transport vehicles within a certain period can also be reduced, and therefore it is also possible to reduce the energy consumption of the article transport facility. In this manner, with the present configuration, the article transport facility can be appropriately operated according to the operational busyness in the facility. The change of the control setting for realizing such an operation is achieved by changing the setting of the transfer operation so as to increase the required transfer time as the level of the operating state is reduced, while maintaining the setting of the traveling speed of the transport vehicle. This can reduce the necessity to change the control items for cooperation with another transport vehicle, including, for example, a setting of an inter-vehicle distance, and it is thus possible to minimize the number of control items that are needed to be changed in response to a change in the operation mode. Therefore, it is also easy to frequently change the operation mode.

Here, it is preferable that the transfer operation control unit changes the setting of the transfer operation such that a movement speed of the target article in the transfer operation is reduced as the level of the operating state is reduced.

With the present configuration, the required transfer time can be increased by reducing the movement speed of the target article in the transfer operation. In addition, the energy consumption for driving the first transferrers and the second transferrers in the transfer operation can be reduced by reducing the movement speed of the target article.

In the above-described configuration, it is preferable that
  each of the transport vehicles and each of the transfer stations are configured to, before movement of the target article is started by the transfer operation, transmit and receive therebetween a speed setting signal indicating a set value of the movement speed,
  the transfer operation control unit sets the movement speed indicated by the speed setting signal such that the movement speed is reduced as the level of the operating state is reduced, and
  each of the first transferrers and each of the second transferrers move the target article in the transfer operation at a speed according to the set value of the speed setting signal.

With the present configuration, the first transferrers and the second transferrers both can be operated based on the set value of the movement speed of the target article in the transfer operation that either the transport vehicles or the transfer stations have. Accordingly, cooperation between each of the first transferrers and each of the second transferrers can be appropriately achieved when the target article is moved by the transfer operation.

It is preferable that the transfer operation includes a transmission and reception process in which each of the transport vehicles and each of the transfer stations transmit and receive therebetween signals including a transfer start signal indicating the start of the transfer operation, and a transfer completion signal indicating the completion of the transfer operation, and
  the transfer operation control unit changes the setting of the transfer operation in such a manner as to increase a period until the transfer completion signal is transmitted after completion of movement of the target article by the transfer operation as the level of the operating state is reduced.

As described above, each of the transport vehicles stops at a transfer station until the transfer operation is completed, or in other words, until the transfer completion signal is transmitted. With the present configuration, the period until the completion of the transfer operation can be a period longer than the period until completion of movement of the target article by the transfer operation. That is, the required transfer time can be a time longer than the time required to move the target article by the transfer operation. Accordingly, with the present configuration, the movement speed of the target article in the transfer operation does not need to be reduced more than necessary, and any required transfer time can be set. For example, in the case of changing the setting of the transfer operation such that the required transfer time is increased, it is also possible to eliminate the need to change the item of the movement speed of the target article. Thus, it is also possible to further reduce the burden of changing control settings.

It is preferable that the operating state index is an index determined based on an operation rate of the plurality of transport vehicles present on the travel path such that the level of the operating state indicated by the operating state index is reduced as the operation rate is reduced.

It is likely that the number of target articles transported in the article transport facility is small when the operation rate of the plurality of transport vehicles is low, and the number of target articles transported in the article transport facility is large when the operation rate of the plurality of transport vehicles is high. With the present configuration, the level of the operating state indicated by the operating state index is reduced as the operation rate is reduced, and therefore the setting of the transfer operation is changed such that the required transfer time is increased. Accordingly, as described above, it is possible to increase the ratio of the distance by which the target article is transported, relative to the travel distance of each of the transport vehicles, and it is thus possible to increase the operation rate of each of the transport vehicles. Thus, it is possible to improve the efficiency of the article transport facility in a quiet period.

It is preferable that one or more or all of the plurality of transfer stations are each provided with an article count detector configured to detect the number of target articles held by the transfer station, and the operating state index is an index determined based on the number of target articles detected by each of the article count detectors such that the level of the operating state indicated by the operating state index is reduced as said number is reduced.

With the present configuration, the operating state of the article transport facility can be determined based on the number of target articles detected by each of the article count detectors. That is, when there are a large number of detected target articles, this means that there are a large number of target articles waiting to be transported, and therefore it can be determined that the article transport facility is in a busy period. On the other hand, when there are a small number of detected target articles, this means that there are a small number of target articles waiting to be transported, and therefore it can be determined that the article transport facility is in a quiet period. With the present configuration, the level of the operating state indicated by the operating state index is reduced as the number of target articles detected by each of the article count detectors is reduced, and therefore the setting of the transfer operation is changed such that the required transfer time is increased. Accordingly, as described above, the distance by which the target article is transported, relative to the travel distance of each of the transport vehicles can be increased, and it is thus possible to increase the operation rate of each of the transport vehicles. Thus, it is possible to improve the efficiency of the article transport facility in a quiet period.

It is preferable that the at least one setting of the traveling speed includes a setting of a maximum speed of the transport vehicles while traveling.

With the present configuration, the setting of the maximum speed of each of the transport vehicles while traveling is maintained even when the setting of the transfer operation is changed according to the operating state index. Accordingly, it is possible to further reduce the necessity to change the control items for cooperation with another transport vehicle, including, for example, a setting of an inter-vehicle distance.

INDUSTRIAL APPLICABILITY

The technique according to the present disclosure is applicable to an article transport facility including a plurality of transport vehicles that travel along a predetermined travel path.

DESCRIPTION OF REFERENCE SIGNS

100: Article transport facility
1: Transport vehicle
10: First transferrer
2: Transfer station
20: Second transferrer
23: Article count detector
9: Target article
H: Transfer operation control unit
Sb: Speed setting signal
Se: Transfer completion signal
Ss: Transfer start signal
Tr: Required transfer time
Tm: Movement time
Tw: Waiting time
R: Travel path

The invention claimed is:

1. An article transport facility, comprising:
a plurality of transport vehicles configured to travel along a predetermined travel path and each comprising a first transferrer configured to transfer a target article;
transfer stations installed at a plurality of locations adjacent to the travel path;
a second transferrer included in on each of the plurality of transfer stations and configured to transfer the target article to and from each of the first transferrers; and
a transfer operation control unit configured to control a transfer operation when transferring the target article between each of the first transferrers and each of the second transferrers,
wherein the transfer operation control unit changes, according to an operating state index indicating a level of an operating state of the plurality of transport vehicles present on the travel path, a setting of the transfer operation such that a required transfer time from start to completion of the transfer operation is increased as the level of the operating state is reduced, while maintaining at least one setting of a traveling speed of the transport vehicles, wherein the operating state index is an index determined based on an operation rate of the plurality of transport vehicles present on the travel path such that the level of the operating state indicated by the operating state index is reduced as the operation rate is reduced.

2. The article transport facility according to claim 1, wherein the transfer operation control unit changes the setting of the transfer operation such that a movement speed of the target article in the transfer operation is reduced as the level of the operating state is reduced.

3. The article transport facility according to claim 2, wherein:
each of the transport vehicles and each of the transfer stations are configured to, before movement of the target article is started by the transfer operation, transmit and receive therebetween a speed setting signal indicating a set value of the movement speed,
the transfer operation control unit sets the movement speed indicated by the speed setting signal such that the movement speed is reduced as the level of the operating state is reduced, and
each of the first transferrers and each of the second transferrers move the target article in the transfer operation at a speed according to the set value of the speed setting signal.

4. The article transport facility according to claim 1, wherein the transfer operation includes a transmission and reception process in which each of the transport vehicles and each of the transfer stations transmit and receive therebetween signals including a transfer start signal indicating the start of the transfer operation and a transfer completion signal indicating the completion of the transfer operation, and
the transfer operation control unit changes the setting of the transfer operation in such a manner as to increase a period until the transfer completion signal is transmitted after completion of movement of the target article by the transfer operation as the level of the operating state is reduced.

5. An article transport facility, comprising:
a plurality of transport vehicles configured to travel along a predetermined travel path and each comprising a first transferrer configured to transfer a target article;
transfer stations installed at a plurality of locations adjacent to the travel path;
a second transferrer included in on each of the plurality of transfer stations and configured to transfer the target article to and from each of the first transferrers; and
a transfer operation control unit configured to control a transfer operation when transferring the target article between each of the first transferrers and each of the second transferrers,
wherein the transfer operation control unit changes, according to an operating state index indicating a level of an operating state of the plurality of transport vehicles present on the travel path, a setting of the transfer operation such that a required transfer time from start to completion of the transfer operation is increased as the level of the operating state is reduced, while maintaining at least one setting of a traveling speed of the transport vehicles,
wherein one or more or all of the plurality of transfer stations are each provided with an article count detector configured to detect the number of target articles held by the transfer station, and
wherein the operating state index is an index determined based on the number of target articles detected by each of the article count detectors such that the level of the operating state indicated by the operating state index is reduced as said number is reduced.

6. The article transport facility according to claim 1, wherein the at least one setting of the traveling speed includes a setting of a maximum speed of the transport vehicles while traveling.

7. The article transport facility according to claim 1, wherein the plurality of transport vehicles are each provided with a load presence detector for detecting that the first transferrer holds the target article, and
the operation rate is based on information, detected by each of the load presence detector, as to whether or not the transport vehicle holds any target article.

* * * * *